(12) United States Patent
Poirette et al.

(10) Patent No.: US 9,097,366 B2
(45) Date of Patent: Aug. 4, 2015

(54) PIPE ELEMENT MADE OF A HOOP-WOUND TUBE WITH TRANSITION ELEMENTS

(71) Applicant: IFP Energies nouvelles, Rueil-Malmaison Cedex (FR)

(72) Inventors: Yann Poirette, Reventin-Vaugris (FR); Daniel Averbuch, Vernaison (FR)

(73) Assignee: IFP Energies nouvelles, Rueil-Malmaison Cedex (FR)

(*) Notice: Subject to any disclaimer, the term of this patent is extended or adjusted under 35 U.S.C. 154(b) by 0 days.

(21) Appl. No.: 13/714,492

(22) Filed: Dec. 14, 2012

(65) Prior Publication Data
US 2013/0192706 A1    Aug. 1, 2013

(30) Foreign Application Priority Data

Dec. 20, 2011  (FR) ..................... 11 03993

(51) Int. Cl.
| F16L 9/04 | (2006.01) |
| F16L 13/02 | (2006.01) |
| F16L 13/04 | (2006.01) |
| E21B 17/10 | (2006.01) |

(52) U.S. Cl.
CPC .............. *F16L 9/04* (2013.01); *E21B 17/1085* (2013.01); *F16L 13/02* (2013.01); *F16L 13/0272* (2013.01); *F16L 13/04* (2013.01)

(58) Field of Classification Search
CPC .............. F16L 9/04; F16L 9/042; F16L 9/22
USPC .................... 138/109, 153, 155, 143
See application file for complete search history.

(56) References Cited

U.S. PATENT DOCUMENTS

| 3,080,179 | A | * | 3/1963 | Huntsinger ............... 285/45 |
| 3,096,105 | A | * | 7/1963 | Risley ............... 285/288.8 |
| 3,324,894 | A | * | 6/1967 | Deal, Jr. ............... 138/109 |
| 4,146,060 | A | * | 3/1979 | Garrett ............... 138/143 |
| 4,178,022 | A | * | 12/1979 | Hanneman ............... 285/288.1 |
| 4,234,368 | A | * | 11/1980 | Schwarz ............... 156/91 |
| 4,300,598 | A | * | 11/1981 | Royer et al. ............... 138/177 |
| 4,314,677 | A | * | 2/1982 | Sareen ............... 241/176 |
| H82 | H | * | 7/1986 | Dittrich et al. ............... 42/76.02 |
| 4,629,218 | A | * | 12/1986 | Dubois ............... 285/148.22 |
| 5,452,507 | A | * | 9/1995 | Brunner et al. ............... 29/428 |
| 5,853,199 | A | | 12/1998 | Wilson |
| 6,042,152 | A | * | 3/2000 | Baldwin et al. ............... 285/55 |
| 6,536,480 | B2 | * | 3/2003 | Guesnon et al. ............... 138/172 |
| 6,808,210 | B1 | * | 10/2004 | Harrison et al. ............... 285/288.1 |
| 8,418,337 | B2 | * | 4/2013 | Salama ............... 29/402.18 |
| 2003/0024587 | A1 | | 2/2003 | Guesnon et al. |
| 2005/0116468 | A1 | | 6/2005 | Otten |
| 2008/0087351 | A1 | * | 4/2008 | Paulshus et al. ............... 138/141 |
| 2010/0263761 | A1 | * | 10/2010 | Niccolls et al. ............... 138/146 |

FOREIGN PATENT DOCUMENTS

| FR | 2 828 121 A1 | 2/2003 |
| FR | 2 828 262 A1 | 2/2003 |
| FR | 2 956 694 A1 | 8/2011 |
| GB | 758616 | 10/1956 |

* cited by examiner

*Primary Examiner* — James Hook
(74) *Attorney, Agent, or Firm* — Fitch, Even, Tabin and Flannery LLP

(57) ABSTRACT

The invention relates to a pipe element comprising at least one hoop-wound tube (T), the hoop-wound tube (T) comprising a central part consisting of a metal core (A) covered by at least one hoop layer (F), at least one connecting part(C). Hoop-wound tube (T) also comprises at least one transition element (B) welded, on one side, to one end of the core (A) and, on the other side, to one end of connecting part (C). This pipe element can be used as an auxiliary line of a drilling riser pipe.

11 Claims, 3 Drawing Sheets

PIPE ELEMENT MADE OF A HOOP-WOUND TUBE WITH TRANSITION ELEMENTS

FIELD OF THE INVENTION

The present invention relates to the sphere of high-pressure pipes for equipping drilling rigs and/or production facilities. More precisely, it relates to an application of the hoop winding technique for reinforcing metal tubes with composite reinforcing elements.

The hoop winding technique consists in winding a reinforcing element, generally in form of a polymer-coated fiber tape, around a metal core so as to increase the internal pressure resistance of the core without significantly increasing the weight thereof, considering the low weight of the tapes.

The core can be a metal tube made of steel for example. The reinforcing element is an elongate element. It can come in form of a strip, a wire, or preferably a wire assembly or a yarn coated with a polymer matrix.

BACKGROUND OF THE INVENTION

According to a hoop winding embodiment, the reinforcing element is wound around the core while applying a tension. Thus, the reinforcing element wound around the core undergoes a tensile stress, which causes the metal core to undergo a compressive stress. The prestress undergone by the core is similar to the prestress that would be produced by an outside pressure.

Subsea reservoir drilling operations are carried out using a riser pipe allowing the blowout preventer located on the seabed to be connected to the surface. The riser is fitted with at least two auxiliary lines referred to as kill line (KL) and choke line (CL), whose main purpose is to provide a hydraulic connection between the sea surface and the sea bottom. More particularly, auxiliary lines make it possible to supply the well with fluid by circulating below a closed blowout preventer and/or to discharge a fluid from the well, without flowing through the riser pipe that does not withstand high pressures. The fluid thus carried, resulting from a kick from an underground reservoir, can circulate at a pressure that can be above 700 bars.

It has been suggested to use hoop-wound tubes for the auxiliary lines of a riser pipe, notably in patents FR-2,828,262 B1 and FR-2,828,121 B1 filed by the applicant. Manufacturing a high-pressure pipe element from a hoop-wound tube is both simple and economical. FIG. 1 shows an embodiment disclosed in the prior art. The pipe element comprises four distinct parts: a metal tube (1) or core, a first connecting means (3), a second connecting means (4) and hoop layers (2). Tube (1) is first manufactured, from a rolled blank for example, then connecting means (3; 4) are directly welded to ends (8, 9) of tube (1). Hoop winding of the metal assembly is then achieved by winding a reinforcing element around tube (1) and part of connecting means (3, 4), Only the outer parts (33) and (63) of the connecting means are not hooped and they have sufficient thickness to withstand at least the same internal pressure as the hoop-wound part.

Thus, making such a pipe requires connecting means (3; 4) whose ends to be welded have dimensions (diameters and thickness) that are suited to tube (1) so that they can be welded thereto directly. These connecting means (3; 4) have to be mechanically compatible with the stress imposed by hoop winding on transition zones (5) and (7). However, the shapes and the dimensions of the connecting means are also imposed by their operational specifications and by the specific links intended for integration of the safety lines on the riser joint, in particular cooperation with the riser joints. All the constraints relative to the connecting means require a specific and complex implementation of these connecting means.

It is therefore not possible to standardize the design of high-pressure pipe elements according to the prior art (KL and CL) that require connections specific to the riser. The main advantages of the standardization of parts are gain in design and manufacturing time, as well as manufacturing costs reduction.

The present invention aims to use a transition element between the hoop-wound tube and the connecting means so as to allow standardization of the components of the pipe element, such as the hoop-wound tube and the connecting means, while keeping a limited weight, sufficient resistance to internal pressure, and a simple and economical design.

SUMMARY OF THE INVENTION

The invention relates to a pipe element comprising at least one hoop-wound tube, said hoop-wound tube comprising a central part consisting of a metal core covered by at least one hoop layer, at least one connecting means. Said hoop-wound tube also comprises at least one transition element welded, on one side, to one end of said core and, on the other side, to one end of said connecting means.

According to the invention, said hoop layers extend on either side of the weld between said transition element and said core.

According to an embodiment of the invention, additional hoop layers extend on either side of the weld between said transition element and said central part.

Advantageously, the hoop layers consist of composite reinforcing elements, notably made from fibers coated with a polymer matrix. Preferably, the reinforcing fibers are selected from among glass fibers, carbon fibers and aramid fibers, and the polymer matrix is selected from among a polyethylene, a polyamide, a polyether ether ketone, a polypropylene, a polyvinylidene fluoride and an epoxide.

According to the invention, the transition element comprises ends geometrically compatible with the weld, on one side, with the end of the core and, on the other side, with the end of the connecting means.

Advantageously, the transition element has an essentially truncated shape between the two ends thereof. Preferably, the conicity of the truncated part of the transition element ranges between 10° and 45°.

The invention also relates to the use of a pipe element according to the invention for manufacturing an auxiliary line of a riser pipe.

The invention further relates to a method of making a pipe element with the aforementioned characteristics, wherein the following stages are carried out:
  making a metallic central part
  welding a transition element to at least one end of said central part
  making at least one hoop layer on said central part, and on either side of the weld between said central part and said transition element
  welding a connecting means onto said transition element.

Preferably, the hoop-wound zone is cooled during the stage of welding said connecting means to said transition element, preferably by sprinkling, by cold air or cryogenically.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

Figure 2:
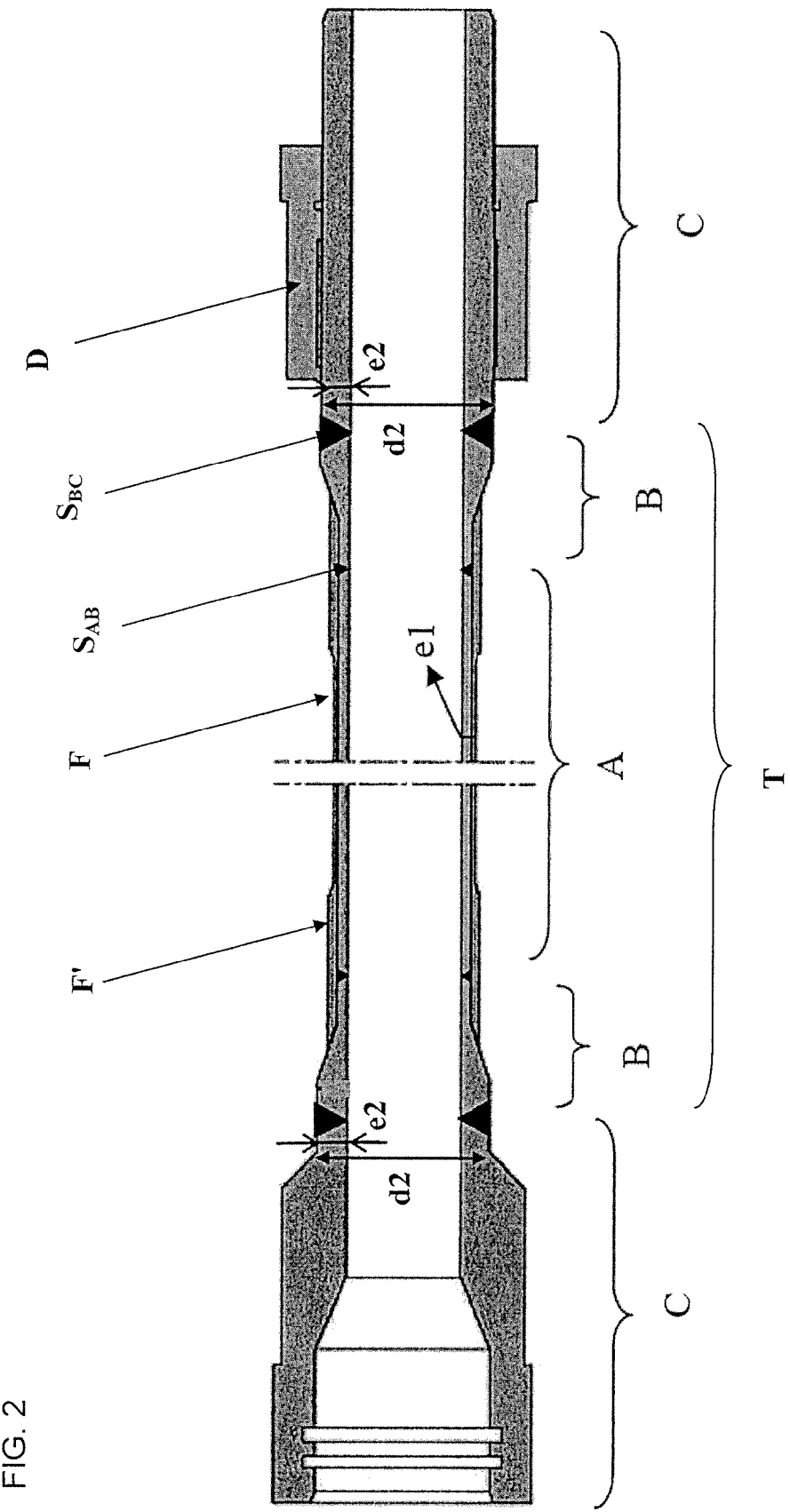
FIG. 2 illustrates a pipe element according to the invention.

FIG. 2 illustrates an embodiment of a high-pressure pipe element according to the invention. The high-pressure pipe element consists of a hoop-wound tube (T) and of two non-hoop-wound connecting means (C) commonly used for connecting riser joints. A connecting means (C) is understood to be any means allowing connection, through the agency of another connecting means, of a pipe element with another pipe element, with a blowout preventer or with a recovery device at the sea surface. These connecting means (C) are tubular parts obtained by machining, forging or casting, independently of hoop-wound tube (1). Each pipe element comprises a male and female connecting means suited to cooperate with one another. At their end intended to be welded to said hoop-wound tube (T), connecting means (C) (male and female) have a tubular shape of outside diameter d2 and thickness e2.

Hoop-wound tube (T) according to the invention consists of a core (A) and of two transition elements (B) arranged between one end of said core (A) and one end of one of said connecting means (C) respectively. Core (A) consists of a metal tube of outside diameter d1 and thickness e1 substantially constant over the length thereof, and of a reinforcing layer. Conventionally, the dimensions of said core (A) are smaller than the dimensions of connecting means (C): $d1 \leq d2$ and $e1 \leq e2$. Furthermore, core (A) can be made from a rolled blank, made of steel for example. Transition elements (B) are tubular elements that can be obtained by steel forging. Said transition elements (B) are welded ($S_{AB}$) to core (A) and they are welded ($S_{BC}$) to a connecting means (C) respectively, using any known welding method, notably friction welding. In order to provide good resistance to the internal pressure related to the pressures of the fluids circulating in the pipe, core (A) is covered over at least the total length thereof with a number of hoop layers (F) made up of a reinforcing element. In the preferred embodiment illustrated, the hoop layer is also applied on either side of the weld zone ($S_{AB}$), therefore also partly on transition elements (B). For this zone, additional hoop layers (F') are applied. The additional hoop layers can extend over at least 50 mm on said core (A). The number of additional hoop layers (F') is so selected that the internal pressure resistance of weld zone ($S_{AB}$) is higher than the internal pressure resistance of the central zone of said core (A). Thus, the pipe element affords the advantage of being more resistant to the internal pressure in transition zones ($S_{AB}$) than in core (A).

Reinforcing element (F) can be made from a carbon fiber-reinforced polyamide matrix. Alternatively, other matrices can be used, such as epoxies, polypropylenes, polyethylenes, polyamides, polyether ether ketones, polyvinylidene fluorides or other fibers such as glass or aramids. Hoop winding is performed with a sufficient number of layers for the tube to withstand a predetermined internal pressure. The number of hoop layers (F) is generally constant over the entire length of core (A). It is reminded that one of the principles of hoop winding consists in inducing a compressive prestress in metal core (A) and in the zone of transition elements (B) covered by reinforcing layers. Thus prestressed, the internal pressure resistance capacity of core (A) is increased since the allowable pressure in this pipe element is increased by the internal pressure value that would balance the hoop winding pressure. Another advantage of hoop winding is the decrease in mass of the pipe element. Indeed, making a pipe element only from metal with the same internal pressure resistance requires a greater tube thickness, which involves a higher tube mass.

According to an embodiment, hoop winding is achieved by winding under tension one or more reinforcing layers (F) on core (A) and part of transition elements (B). The reinforcing element under tension induces a compressive stress in core (A) and the covered part of transition elements (B).

The outer surface of hoop-wound tube (T) of the pipe element according to the invention can be coated with a protective sheath notably intended to protect it against the marine environment. This protective sheath can be applied by reeling, i.e. by winding an elongate element around hoop-wound tube (T) in contiguous turns bonded together. The elongate element can be reeled without tension and it can be made from a glass fiber or Kevlar®-reinforced polyamide matrix. The protective sheath can also be used to give the outside tint of the hoop-wound tube, white for example.

In FIG. 2, part (D) represents a strain take-up means.

Figure 1:
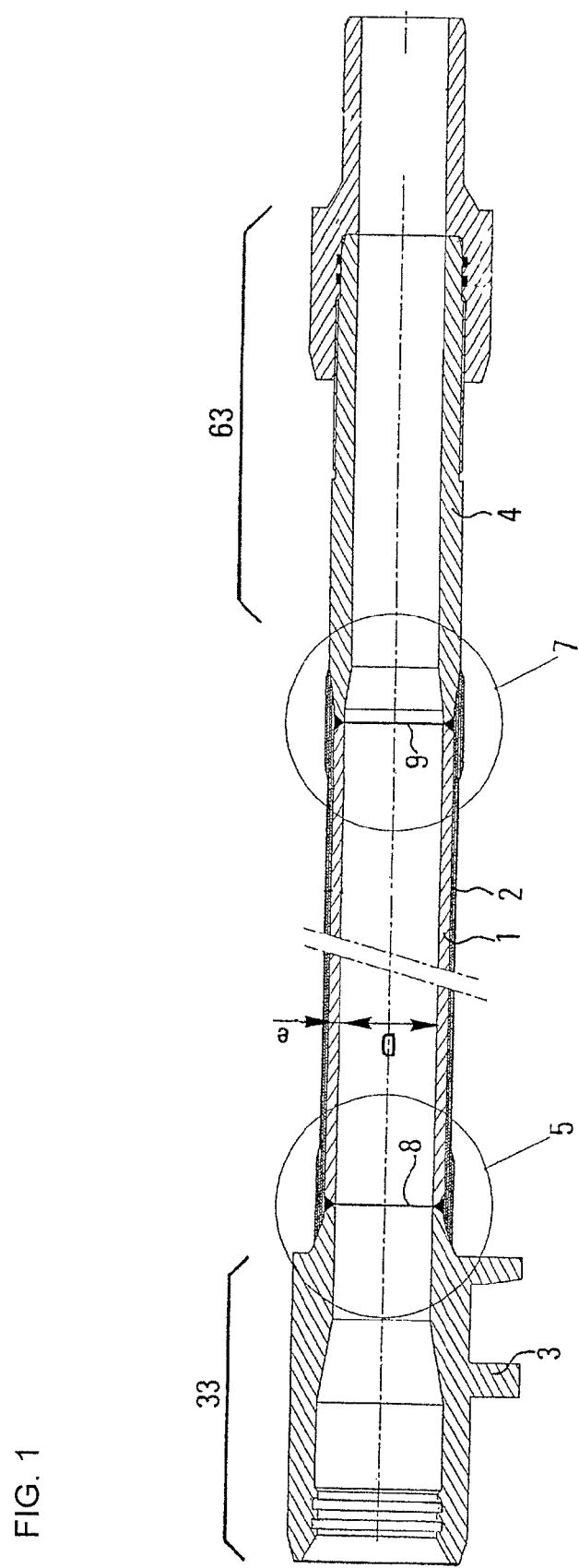
FIG. 1, already described, illustrates a pipe element according to the prior art.

Furthermore, the invention can comprise a wearing part as shown by reference number 70 in FIG. 1, intended to cooperate with a female connecting means (C) of another pipe element. This wearing part is fastened, preferably screwed, onto a connecting means (C), thus making up the male part of this connecting means (C). After a certain number of connections between pipe elements, the male connecting means (C) may be damaged. In this case, it is possible to change only the wearing part and not all the connecting means (C).

Figure 3:
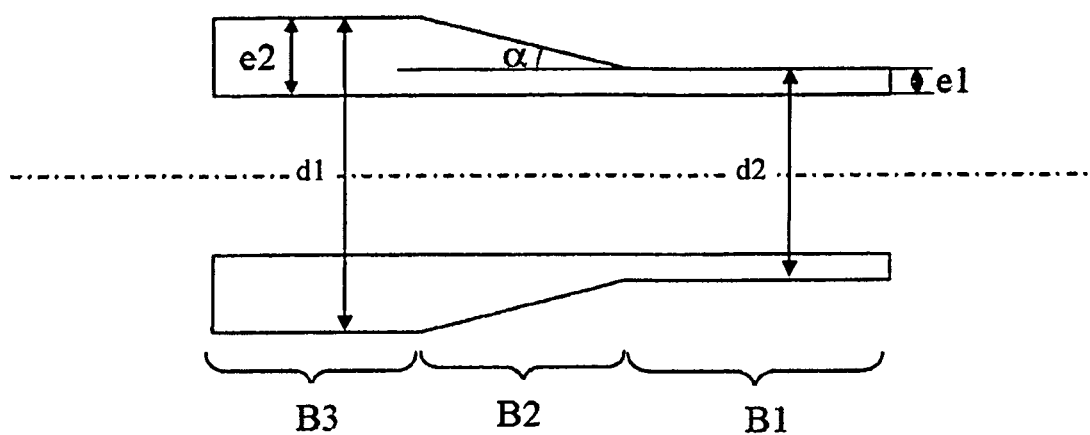
FIG. 3 shows a transition element according to an embodiment of the invention.

FIG. 3 shows an embodiment of a transition element (B). This transition element is of essentially truncated shape so as to connect the distinct outside diameters d1 of core (A) and d2 of connecting means (C). This truncated shape allows material continuity, which provides internal pressure resistance.

According to the preferred embodiment of the invention illustrated in FIG. 3, transition element (B) consists of a cylindrical first part (B1), of a truncated second part (B2) and of a cylindrical third part (B3), so as to have a transition element of continuous section, i.e. without the discontinuities formed by shoulders for example. The cylindrical first part (B1) is the part that is welded to core (A) and third part (B3) is the part welded to one of said connecting means (C). Preferably, outside diameter d1 and thickness e1 of cylindrical first part (B1) are substantially identical to the outside diameter and the thickness of core (A). Thus, welding of transition element (B) to core (A) is facilitated. Similarly, outside diameter d2 and thickness e2 of cylindrical third part (B3) are substantially identical to the outside diameter and the thickness of the end of connecting means (C) so as to facilitate the welding operation.

The conicity of said truncated part (B2) ranges between 10° and 45°. In fact, the conicity of said truncated part has to be greater than 10° so as to limit the length of part (B2), in order to reduce the mass of transition element (B) and consequently the mass of the pipe element. Furthermore, the conicity has to remain below 45° so as to facilitate and improve the winding of composite reinforcing element (F). Besides, hoop layers (F) and additional hoop layers (F') can partly cover said truncated second part (B2). In this zone where second part (B2) is covered, the number of hoop layers (F and F') decreases progressively because the metal thickness of transition element (B) becomes sufficient for withstanding the internal pressure.

In order to decrease the weight of transition element (B), it is of interest to limit the length of cylindrical third part (B3). This length is useful to enable welding of connecting means (C) without causing any thermal damage to composite reinforcing element (F). It is therefore suggested to use a system for cooling the hoop-wound zone, for example by sprinkling, by cold air or cryogenically, when welding ($S_{BC}$) transition element (B) to connecting means (C). Thus, hoop layers (F) undergo no thermal damage during the welding operation, even though the length of third part (B3) is small, i.e. insufficient to prevent alone thermal damage to the hoop layers.

Making a pipe element by means of a transition element (B) allows to design and to manufacture core (A) and connecting means (C) independently, but specific to each facility. By means of the invention, for identical operational specifications, only transition elements (B) can require adjustment of their dimensions and shapes depending on the connecting elements (C) used. Besides, by means of the invention, connecting means (C) are no longer covered by hoop layers. It is thus possible to directly use the connecting means (C) commonly used in high-pressure pipe elements.

If necessary, the connecting means can be changed, by cutting in weld zone $S_{BC}$, and new means can be welded again to the transition elements on the body of the pipe according to the invention.

The pipe element according to the invention can be used for manufacturing an auxiliary line of a drilling riser pipe, a kill line, a choke line, a booster line or a mud return line for example.

A pipe element according to the invention can be manufactured by carrying out the following stages:
  making metal core (A), from steel for example, notably from a rolled blank,
  welding to at least one end of said core (A) a transition element (B) and preferably welding to each end of core (A) a transition element (B),
  making at least one hoop layer on said core (A), and on either side of welds ($S_{AB}$) between said core (A) and said transition element (B), preferably with additional hoop layers extending on either side of welds ($S_{AB}$),
  welding a connecting means (C) onto each transition element (B).

According to an embodiment, the hoop-wound zone is cooled during the stage of welding said connecting means (C) to said transition element (B), preferably by sprinkling, by cold air or cryogenically.

Variants

In a variant of the illustrated embodiment, the following characteristics can be achieved separately or in combination:
  hoop-wound tube (T) can comprise a single transition element (B), one of the two connecting means (C) being directly welded onto core (A), so as to reduce the size and the weight of the pipe element,
  the shape of transition element (B) can be purely truncated, transition element (B) can be a standard component, thus all the components of the high-pressure pipe element are standard components, in this case, the diameters and thickness of the ends of transition elements (B) are then independent of central part (A) and of connecting means (C),
  the prestress induced in the core through hoop winding can be achieved by other means than tensioning the reinforcing tape, thus hoop winding can notably be achieved:
    by internal pressurization of the pipe element causing plastic deformation of core (A), this technique is referred to as self-hooping: the reinforcing element is wound without tensional stress or with a very low stress on the metal tube ; the hoop stress is introduced during hydraulic testing of the tube thus formed at a pressure causing the elastic limit to be exceeded in the metal tube and plastic deformation of the tube. After return to a zero pressure, residual compressive stresses remain in the metal tube and tensile stresses in the composite reinforcing elements, or
    by deformation of core (A) through tensile strain on core (A) and by applying pressure on the outside of core (A) (this embodiment is described in patent application FR-2,961,427 filed by the applicant).

Hoop Winding Embodiment Example

The embodiment illustrated in FIGS. 2 and 3 is used for making a high-pressure pipe element according to the invention. Eighteen hoop layers (F) can cover core (A) and the coverage zone of the two welds ($S_{AB}$). The first layer is directly deposited on core (A), and the last layer constitutes the outside surface of the hoop-wound tube. The tension applied in the layers is set at a value around 2400 N. In order to increase the internal pressure resistance around weld ($S_{AB}$), twenty-two additional hoop layers (F') are deposited on either side of weld ($S_{AB}$). The first layer of the additional hoop layers (F') rests directly on the last layer of hoop layers (F). The tension applied in the additional hoop layers can be 1000 N. For example, additional hoop layers (F') extend from weld ($S_{AB}$) over a length at least equal to 50 mm on core (A) and over a length at least equal to 25 mm on the side of transition element (B). Beyond the length over which additional hoop layers (F') extend in the central part, the number of additional hoop layers decreases from twenty-two to zero.

The invention claimed is:

1. A pipe element comprising at least one hoop-wound tube, the at least one hoop-wound tube comprising a central part comprising a metal core covered by at least one hoop layer, and at least one connecting means, characterized in that the at least one hoop-wound tube also comprises at least one transition element welded, on one side, to one end of the core and, on the other side, to one end of the at least one connecting means, wherein the at least one transition element comprises a cylindrical first part, a truncated second part with a continuous section, and a cylindrical third part, and wherein an outside diameter of the cylindrical first part is substantially identical to an outside diameter of the core, a thickness of the cylindrical first part is substantially identical to a thickness of the core, an outside diameter of the cylindrical third part is substantially identical to an outside diameter of the connecting means, and a thickness of the cylindrical third part is substantially identical to a thickness of the connecting means.

2. An element as claimed in claim 1, wherein the at least one hoop layer extends on either side of the weld between the at least one transition element and the core.

3. An element as claimed in claim 2, wherein additional hoop layers extend on either side of the weld between the at least one transition element and the central part.

4. A pipe element as claimed in claim 1, wherein the at least one hoop layer comprises composite reinforcing elements comprising reinforcing fibers coated with a polymer matrix.

5. A pipe element as claimed in claim 4, wherein the reinforcing fibers are selected from among glass fibers, carbon fibers and aramid fibers, and the polymer matrix is selected from among a polyethylene, a polyamide, a polyether ether ketone, a polypropylene, a polyvinylidene fluoride and an epoxide.

6. A pipe element as claimed in claim 1, wherein an end of the two ends of the at least one transition element is geometrically compatible with the weld to the end of the core, and another end of the two ends of the at least one transition element is geometrically compatible with the weld to the end of the at least one connecting means.

7. A pipe element as claimed in claim 1, wherein the conicity of a truncated part of the at least one transition element ranges between 10° and 45°.

8. A method of manufacturing an auxiliary line of a drilling riser pipe comprising joining at least two pipe elements, wherein each of the at least two pipe elements is the pipe element as claimed in claim 7.

9. A method of making the pipe element as claimed in claim 1, wherein the following stages are carried out:
    making the metallic central part,
    welding the at least one transition element to at least one end of the central part,
    making the at least one hoop layer on the central part, and on either side of the weld between the central part and the at least one transition element, and
    welding the at least one connecting means onto the at least one transition element.

10. A method as claimed in claim 9, wherein the hoop-wound zone is cooled during the stage of welding the at least one connecting means to the at least one transition element, and the hoop-wound zone is cooled by sprinkling, by cold air or cryogenically.

11. A pipe element comprising:
    at least one hoop-wound tube, a central part of the at least one hoop-wound tube comprising a metal core covered by at least one hoop layer;
    at least one connecting part; and
    at least one transition element comprising a cylindrical first part welded to the core, welded to the core, a cylindrical second part welded to the at least one connecting part, and a conically tapered section between the cylindrical first part and the cylindrical second part, wherein an outside diameter of the cylindrical first part is substantially identical to an outside diameter of the core, a thickness of the cylindrical first art is substantially identical to a thickness of the core, an outside diameter of the cylindrical third part is substantially identical to an outside diameter of the at least one connecting part, and a thickness of the cylindrical third art is substantially identical to a thickness of the at least one connecting part.

\* \* \* \* \*